US012767057B2

(12) United States Patent
Stephan

(10) Patent No.: US 12,767,057 B2
(45) Date of Patent: Oct. 20, 2026

(54) CENTER CONSOLE AND FRONT SEAT ASSEMBLY FOR A VEHICLE

(71) Applicant: Ford Global Technologies, LLC, Dearborn, MI (US)

(72) Inventor: Joerg Stephan, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 356 days.

(21) Appl. No.: 18/465,593

(22) Filed: Sep. 12, 2023

(65) Prior Publication Data

US 2024/0101036 A1 Mar. 28, 2024

(30) Foreign Application Priority Data

Sep. 28, 2022 (DE) ......................... 102022124912.3

(51) Int. Cl.

| | |
|---|---|
| ***B60R 7/04*** | (2006.01) |
| ***B60N 2/75*** | (2018.01) |
| ***B60N 3/10*** | (2006.01) |
| ***B60R 16/03*** | (2006.01) |
| ***H02J 50/10*** | (2016.01) |

(52) U.S. Cl.

CPC ................ *B60R 7/04* (2013.01); *B60N 2/793* (2018.02); *B60R 16/03* (2013.01); *H02J 50/10* (2016.02)

(58) Field of Classification Search

None

See application file for complete search history.

(56) References Cited

U.S. PATENT DOCUMENTS

| | | | | |
|---|---|---|---|---|
| 7,104,580 | B2 | 9/2006 | Clark et al. | |
| 10,709,249 | B2 | 7/2020 | Liu et al. | |
| 12,584,684 | B2 * | 3/2026 | Hunter | F25D 23/10 |
| 2010/0314896 | A1 | 12/2010 | Skibinski et al. | |
| 2015/0115641 | A1 | 4/2015 | Inoue et al. | |
| 2015/0175040 | A1 * | 6/2015 | Meszaros | B60N 2/3045 297/188.01 |
| 2018/0178681 | A1 * | 6/2018 | Yogo | B60N 2/206 |
| 2020/0217578 | A1 * | 7/2020 | Wang | F25D 23/003 |

FOREIGN PATENT DOCUMENTS

| | | | | | |
|---|---|---|---|---|---|
| CN | 107719077 | A | * | 2/2018 | B60R 7/06 |
| CN | 213705335 | U | | 7/2021 | |
| DE | 10334999 | A1 | * | 2/2005 | B60N 2/793 |
| DE | 10336309 | B4 | | 11/2007 | |
| DE | 102008007254 | A1 | * | 8/2008 | A47J 31/005 |
| DE | 102009055834 | A1 | | 6/2011 | |
| DE | 10321837 | B4 | | 3/2014 | |
| EP | 1295756 | A1 | * | 3/2003 | B60N 2/79 |
| FR | 3066730 | A1 | * | 11/2018 | B60N 3/08 |

OTHER PUBLICATIONS

Range Rover; 2006-2013 Range Rover Sport Center Console Cool Box Refrigerator, Amazon. (Year: 2020).*

* cited by examiner

*Primary Examiner* — Hung Q Dang

(74) *Attorney, Agent, or Firm* — Vichit Chea; Price Heneveld LLP

(57) ABSTRACT

A center console for a vehicle, having a storage trough which extends over at least a predominant part of a length of the center console. In order to provide a center console that can be easily configured by a user as required, the center console has at least two different electrical functional units which each individually are selectively arrangeable at least partially in a storage space of the storage trough.

14 Claims, 3 Drawing Sheets

CENTER CONSOLE AND FRONT SEAT ASSEMBLY FOR A VEHICLE

CROSS REFERENCE TO RELATED APPLICATION(S)

This application claims foreign priority benefits under 35 U.S.C. § 119(a)-(d) to German Application No. 102022124912.3 filed Sep. 28, 2022, which is hereby incorporated by reference in its entirety.

FIELD OF THE DISCLOSURE

The present disclosure generally relates to a center console for a vehicle, having at least one storage trough which extends over at least a predominant part of a length of the center console, and also relates to a front seat assembly for a vehicle, having at least one front seat and at least one center console that runs alongside the front seat.

BACKGROUND OF THE DISCLOSURE

Motor vehicles are commonly equipped with a center console which normally extends rearwardly from a knee region between two front footwells as far as between two front seats. Such center consoles can take a wide variety of forms, and normally have at least one functional unit, for example a beverage holder or the like.

It would also be desirable to provide a center console that can be easily configured by a user as required.

SUMMARY OF THE DISCLOSURE

According to one aspect of the present disclosure, a center console for a vehicle includes a storage trough which extends over at least a predominant part of a length of the center console, and at least two different electrical functional units which each individually are selectively arrangeable at least partially in a storage space of the storage trough.

Embodiments of the first aspect of the disclosure can include any one or a combination of the following features:

- at least one of the at least two different electrical functional units is configured as a coffee machine or as an entertainment system or as an active cooling box;
- at least one additional container is arrangeable, in addition to the at least two different electrical functional units at least partially, in the storage space of the storage trough;
- the storage trough has at least one elevated forward portal portion that provides a shelf on which an article can be placed;
- the portal portion has at least one induction charging unit arranged in a region of the shelf;
- the center console extends alongside a front seat of the vehicle; and
- the center console and the front seat are included in a front seat assembly of the vehicle.

According to another aspect of the present disclosure, a front seat assembly includes at least a front seat, and a center console that extends alongside the front seat. The center console includes a storage trough which extends over at least a predominant part of a length of the center console, and at least two different electrical functional units which each individually are selectively arrangeable at least partially in a storage space of the storage trough.

Embodiments of the second aspect of the disclosure can include any one or a combination of the following features:

- the front seat has, on a side facing toward the center console, an armrest which extends over a rearward portion of the storage trough;
- the front seat assembly where at least one of the at least two different electrical functional units is configured as a coffee machine or an active cooling box arranged at least predominantly under the armrest;
- the electrical functional units are in the form of a coffee machine or of an active cooling box that is arranged at least predominantly under the armrest;
- the armrest has at least one beverage holder arranged on a forward end of the armrest; and
- the armrest is arranged pivotably on the front seat.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
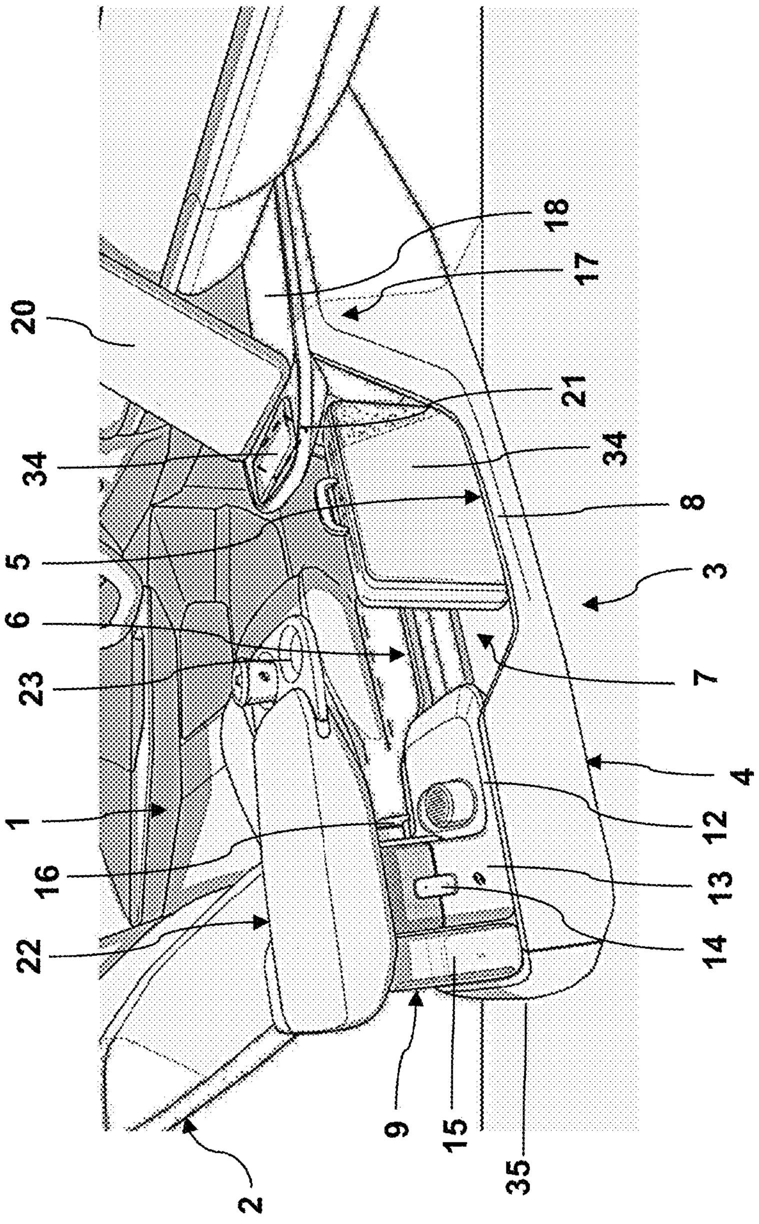
FIG. 1 is a schematic and perspective illustration of an exemplary embodiment of a front seat assembly in a vehicle having a center console in a first configuration.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The FIG.s are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a tray assembly for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In the various figures, identical parts are denoted by the same reference designations, for which reason the parts may generally also be described only once.

FIG. 1 is a schematic and perspective illustration of an exemplary embodiment of a front seat assembly 1 in a first configuration arranged in a motor vehicle. The front seat assembly 1 has a front seat 2 and has a center console 3 running alongside the front seat 2. For the sake of clarity, a further front seat on the opposite side of the center console 3 is not shown.

The center console 3 has a storage trough 4 which extends over at least a predominant part of a length of the center console 3. The storage trough 4 has a longitudinally extending right-hand side wall 5 and a longitudinally extending left-hand side wall 6, which laterally delimit a storage space 7 of the storage trough 4 and are of identical design. In particular, each side wall 5 and 6 has a middle portion 8 of reduced height, such that an article 34, in this example in the form of a briefcase, can also be laterally placed into and removed from the storage space 7 of the storage trough 4. The storage trough 4 furthermore has a rear wall 35, which is arranged on both side walls 5 and 6 and which can preferably be removed and installed without the use of tools.

Figure 2:
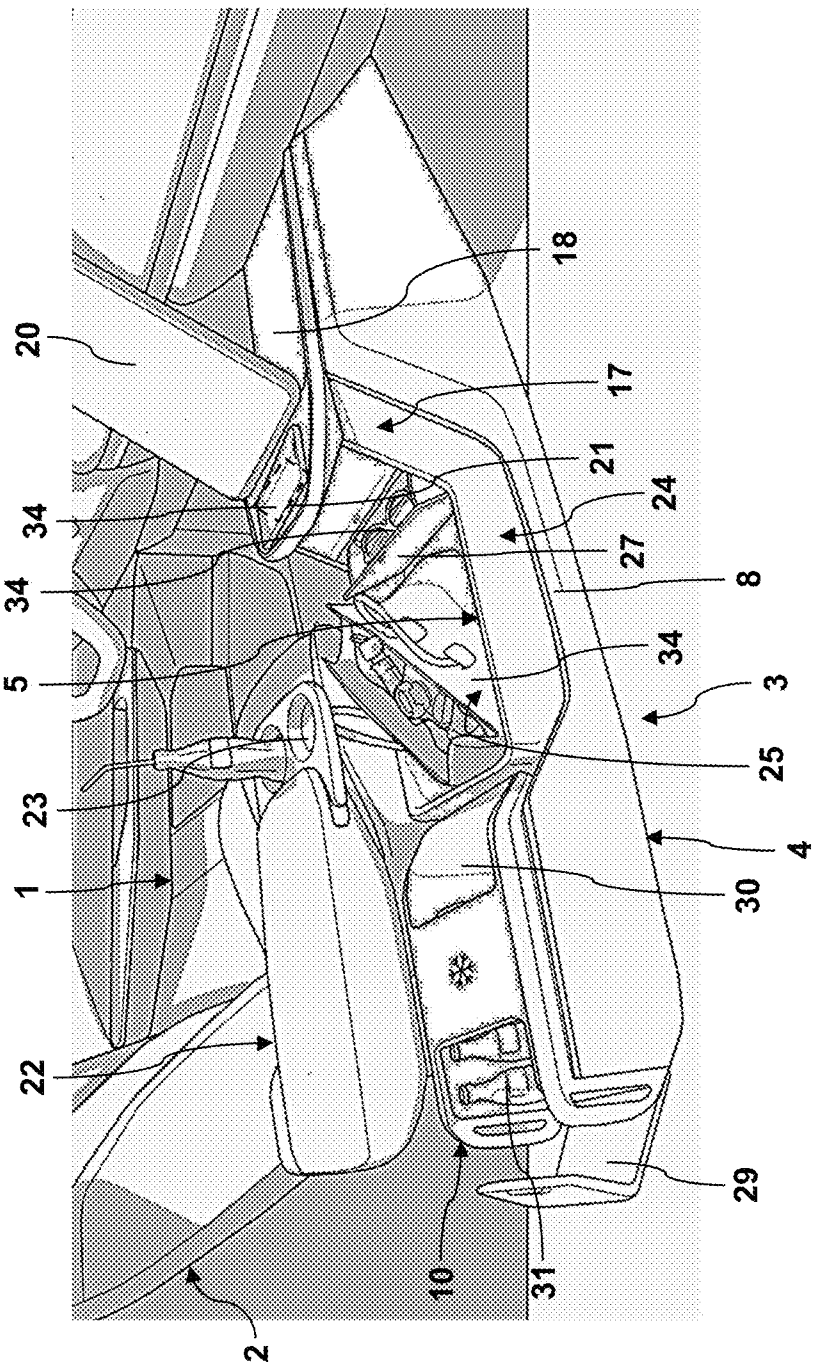
FIG. 2 is a schematic and perspective illustration of the front seat assembly and center console shown in FIG. 1 in a second configuration.
Figure 3:
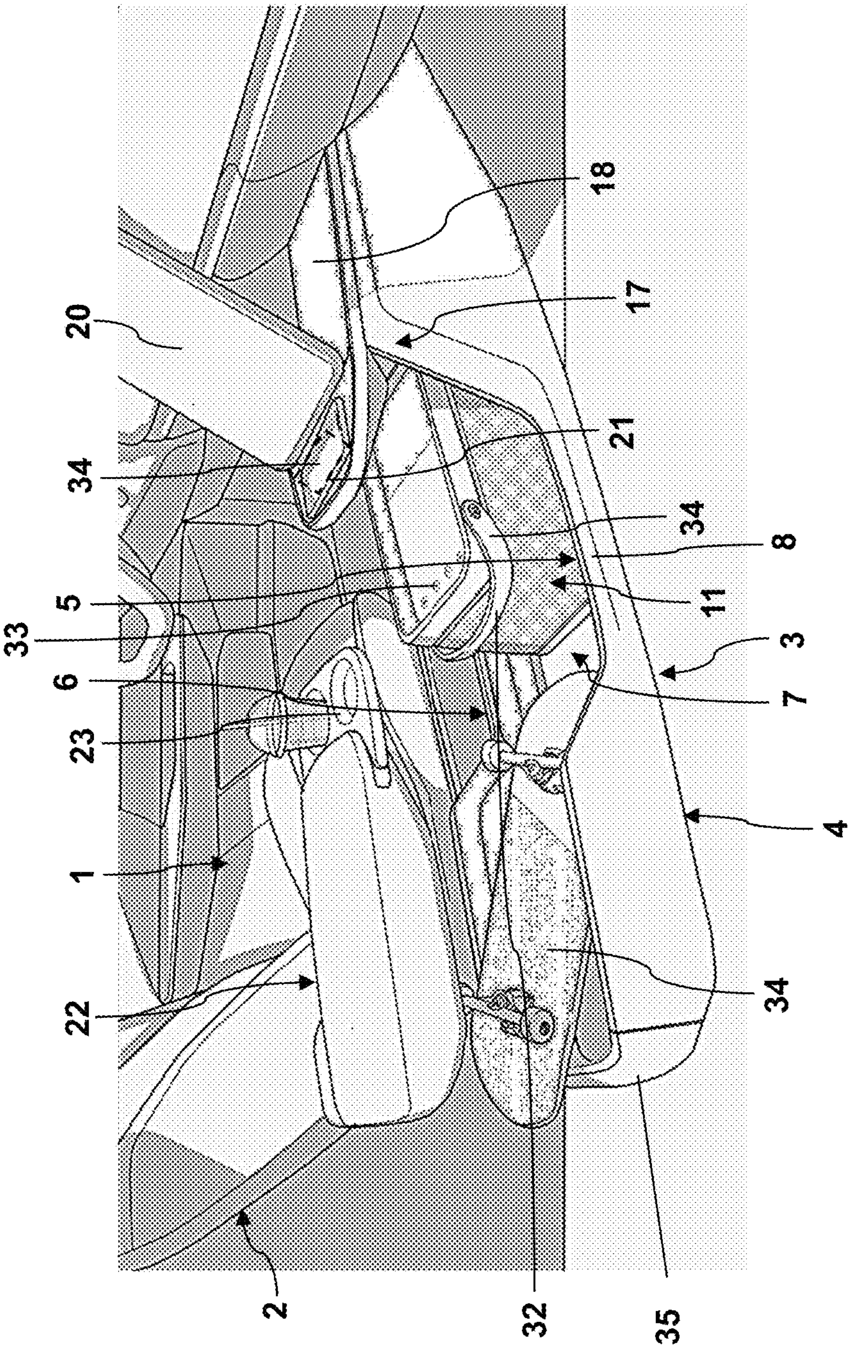
FIG. 3 is a schematic and perspective illustration of the front seat assembly and center console shown in FIGS. 1 and 2 in a third configuration.

The center console 3 has three different electrical functional units including electrical functional units 9, 10 illustrated in FIG. 2 and electrical functional unit 11 illustrated in FIG. 3, which each individually are selectively arrangeable, or can be selectively arranged, at least partially in the storage space 7 of the storage trough 4.

In FIG. 1, an electrical functional unit 9 is arranged partially in the storage space 7 of the storage trough 4, specifically in a rearward region of the storage trough 4. The electrical functional unit 9 is configured for example as a fully automatic coffee machine. The electrical functional unit 9 has a base 12 that is form-fittingly inserted into the rearward region of the storage trough 4. The electrical functional unit 9 may otherwise be configured as a conventional coffee machine for example, but the disclosure is not intended to be limited to a particular design of the coffee machine. The foot 12 is expediently designed so as to enable the electrical functional unit 9 to be arranged on the storage trough 4 as shown in FIG. 1. Of the electrical functional unit 9, the illustration otherwise shows a housing 13, a water tank 15 and a coffee dispensing unit 16, the housing having a switch 14.

The storage trough 4 has at least one elevated forward portal portion 17 that provides a shelf 18 on which an article 34, in this case example in the form of a smartphone, can be placed. The shelf 18 extends forwardly as far as behind a touchscreen 20 of the vehicle, such that an article 34 can also be placed behind the touchscreen. The portal portion 17 has an induction charging unit 21, arranged in the rearward region of the shelf 18, for charging inductively one or more batteries in mobile devices.

The front seat 2 has, on its side facing toward the center console 4, an armrest 22 that extends over a rearward portion of the storage trough 4. The electrical functional unit 9 in the form of the coffee machine is arranged under the armrest 22. The armrest 22 has two beverage holders 23 arranged on the forward end of the armrest 22.

FIG. 2 is a schematic and perspective illustration of the front seat assembly 1 shown in FIG. 1 in a second configuration. In the second configuration, instead of the electrical functional unit 9 in the form of a coffee machine, an electrical functional unit 10 in the form of an active cooling box is arranged in the storage trough 4.

Furthermore, in the second configuration, the center console 3 has an additional container 24 which is arranged, in addition to the electrical functional unit 10 configured as an active cooling box, at least partially in the storage space 7 of the storage trough 4, specifically forward of the electrical functional unit 10.

The additional container 24 has an upwardly open storage compartment 25, in which an article 34 in the form of a bag is arranged. The storage compartment 25 is forwardly adjoined by an elevated portion of the additional container 24, on which an elevated portion there is arranged a stowage compartment 27 which is closable or is pivotable about a horizontal transverse axis (not shown) and in which an article 34 in the form of spectacles, for example, is arranged and which is shown in an open position. The additional container 24 may be form-fittingly inserted into the storage space 7 of the storage trough 4.

The electrical functional unit 10 in the form of the active cooling box has a rearward flap 29, which is shown in an open position, and a forward flap 30, which is shown in a closed position. A beverage container, for example, 31 can be taken from the electrical functional unit 10 via the relevant flap 29 or 30. In this refinement of the functional unit 10, it is expedient for the rear wall 35 of the storage trough 4 to be removable such that the rearward flap 29 can be opened. If the functional unit 10 in the form of an active cooling box has no rearward flap, the rear wall 35 may be arranged as shown in FIG. 1.

FIG. 3 is a schematic and perspective illustration of the front seat assembly 1 shown in FIGS. 1 and 2 in a third configuration. In the third configuration, only one electrical functional unit 11, in the form of an entertainment system, is arranged in the storage trough 4. The electrical functional unit 11 is arranged in a forward region of the storage trough 4, such that the rearward portion of the storage trough 4 is available for storing other articles 34, in this example in the form of a skateboard.

The electrical functional unit 11 has a handle 32 in the form of a carrying strap, by which the electrical functional unit 11 can be transported. The electrical functional unit 11 furthermore has operator control buttons 33 by use of which the settings of the electrical functional unit 11 can be configured. A width of the electrical functional unit 11 corresponds to a width of the storage space 7 of the storage trough 4, at least in a base region of the storage space 7.

In one embodiment, the armrest 22 may be arranged pivotably on the front seat 2 such that the armrest 22 can be pivoted into an opening position, which makes it easier for the functional unit 9 or 10 or 11 arranged under the armrest 22 to be removed and for the functional unit to be installed. The rear wall 35, which can preferably be removed and installed without the use of tools, can also make it easier for the relevant functional units to be installed and removed.

According to the disclosure, a center console is provided having at least two different electrical functional units which each individually are selectively arrangeable or arranged at least partially in a storage space of the storage trough.

The features and measures individually specified in the description may be combined with one another in any technically meaningful way and reveal further refinements of the disclosure. The description additionally characterizes and specifies the center console and front seat assembly, in particular in conjunction with the figures.

According to the disclosure, a user can easily adapt the center console to the presently desired use of the vehicle by selecting, from two or more electrical functional units, the electrical functional unit suited to the presently desired use of the vehicle, and arranging the selected electrical functional unit on the center console. For this purpose, the center console may thus have two or more different electrical functional units which each individually are selectively arrangeable, or can be selectively arranged, at least partially in the storage space of the storage trough.

In order to be able to ensure a supply to the electrical functional unit that is presently arranged on the center console, the center console may have at least one electrical energy supply interface to which the presently selected electrical functional unit is connectable. The electrical energy supply interface and an associated energy supply connector of the relevant electrical functional unit may be configured and arranged such that, when the electrical functional unit assumes a particular position relative to the center console while being installed on the center console, the electrical functional unit is automatically connected to the electrical energy supply interface. Alternatively, at least one electrical functional unit may have an electrical energy store and can thus be operated independently of an electrical system of the vehicle.

In order to be able to ensure communication between the electrical functional unit that is presently arranged on the center console and a vehicle electronics system, the center console may have at least one communication interface to which the presently selected electrical functional unit is connectable. The communication interface and a communication port of the relevant electrical functional unit may be configured and arranged such that, when the electrical functional unit assumes a particular position relative to the center console while being installed on the center console, the electrical functional unit is automatically connected to the communication interface. Alternatively, for the purposes of communication with the vehicle electronics system, the electrical functional unit may be wirelessly connected to the vehicle electronics system.

In the context of the disclosure, it may also occur that the user, depending on their requirements, does not arrange any of the electrical functional units on the center console, such that the entire storage trough, or a total storage space provided by the storage trough, is fully available for storing other articles.

The center console may in particular be installed in a vehicle in the form of a motor vehicle, for example a passenger motor vehicle or utility motor vehicle. Such a vehicle therefore constitutes a further aspect according to the disclosure.

In one advantageous embodiment, the at least one electrical functional unit is configured as a coffee machine or as an entertainment system or as an active cooling box. The coffee machine may, for example, be configured as a fully automatic coffee machine. The coffee machine may for example be arranged in a rearward portion of the storage trough, that is to say in a portion of the storage trough that is normally arranged between two front seats of the vehicle.

The entertainment system serves for playing back acoustic and/or visual information for the purposes of entertaining occupants of the vehicle. The entertainment system may have input buttons, keys or the like for configuring settings of the entertainment system. The entertainment system may have at least one loudspeaker for playing back acoustic information. The entertainment system may furthermore have at least one handle for enabling the entertainment system to be carried outside the vehicle, in order that the entertainment system can be carried to a particular location at which it is to be operated for entertainment purposes.

The active cooling box functions as a refrigerator, but does not need to be configured as a cabinet for this purpose. The active cooling box can be used for example to provide cold beverages, typically in containers, in the vehicle, which is advantageous in particular on relatively long journeys, for example holiday journeys. The active cooling box may for example be arranged in a rearward portion of the storage trough, that is to say in a portion of the storage trough that is normally arranged between two front seats of the vehicle. The active cooling box may have at least one closable rearward access opening and/or at least one closable forward access opening.

In a further advantageous embodiment, the center console has at least one additional container which is arrangeable, in addition to the electrical functional unit configured as a coffee machine or as an active cooling box, at least partially in the storage space of the storage trough. The additional container may in particular provide two or more smaller storage compartments, which may be permanently open or of closable configuration and can prevent loose articles from rolling around in the storage space of the storage trough while the vehicle is in motion. For example, the additional container may have a closable compartment for spectacles for example, or the like. The additional container may be arranged in the storage trough forward of the electrical functional unit configured as a coffee machine or as an active cooling box.

In a further advantageous refinement, the storage trough has at least one elevated forward portal portion that provides a shelf on which an article can be placed. The portal portion is configured such that the storage space of the storage trough also extends, in part, under the portal portion. In this way, the storage space is restricted as little as possible by the presence of the portal portion.

In a further advantageous refinement, the portal portion has at least one induction charging unit arranged in the region of the shelf. In this way, a mobile device, for example a smartphone having a rechargeable battery, that has been placed on the shelf can be electrically charged by use of the induction charging unit.

A front seat assembly is also provided having the center console which is designed according to any one of the aforementioned embodiments or a combination of at least two of the embodiments. The advantages mentioned above with regard to the center console are correspondingly associated with the front seat assembly.

In one advantageous embodiment, the front seat has, on its side facing toward the center console, an armrest which extends over a rearward portion of the storage trough, wherein the electrical functional unit in the form of the coffee machine or of the active cooling box is arranged at least predominantly under the armrest. In this way, the electrical functional unit configured as a coffee machine or as an active cooling box is arranged in a protected position under the armrest. The space available between the armrest and the rearward portion of the storage trough is furthermore utilized effectively. The armrest may be immovable and/or pivotable about a horizontal transverse axis.

In a further advantageous embodiment, the armrest has at least one induction charging unit arranged in the region of the shelf. The armrest is thus provided with a further function, which is advantageous in particular if the electrical functional unit is configured in the form of a coffee machine or an active cooling box, such that a beverage correspondingly provided by use of the electrical functional unit can be arranged on the beverage holder of the armrest. The armrest may also have two beverage holders which are mutually spaced in a transverse direction, that is to say a dedicated beverage holder for each front seat of the vehicle.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A center console for a vehicle, the center console comprising:

a storage trough which extends over at least a predominant part of a length of the center console, the storage trough having an electrical energy supply interface; and at least two different electrical functional units which each individually are selectively arrangeable at least partially in a storage space of the storage trough, wherein the at least two different electrical functional units includes a first electrical functional unit configured as a coffee machine having an electrical energy supply connector configured to couple with the energy supply interface and a second electrical functional unit configured as an active cooling box having an energy supply connector configured to couple with the electrical energy supply interface, wherein the at least two different electrical functional units are each removable from and insertable into the storage space of the storage trough by a user, wherein one of the first and second different electrical functional units are selected and inserted by the user to arrange on the center console, and wherein the electrical energy supply interface is configured to automatically connect with the energy supply connector of the functional unit selected and inserted.

2. The center console according to claim 1, wherein the at least two different electrical functional units further include a third electrical functional unit configured an entertainment system.

3. The center console according to claim 1, further comprising:

at least one additional container which is arrangeable, in addition to the at least two different electrical functional units at least partially, in the storage space of the storage trough.

4. The center console according to claim 1, wherein the storage trough has at least one elevated forward portal portion that provides a shelf on which an article can be placed.

5. The center console according to claim 4, wherein the portal portion has at least one induction charging unit arranged in a region of the shelf.

6. The center console according to claim 1, wherein the center console extends alongside a front seat of the vehicle.

7. The center console according to claim 6, wherein the center console and the front seat are included in a front seat assembly of the vehicle.

8. The center console according to claim 1, wherein the second electrical functional unit functions as a refrigerator.

9. A front seat assembly for a vehicle, the front seat assembly comprising:

a front seat; and a center console that extends alongside the front seat, wherein the center console comprises:

a storage trough which extends over at least a predominant part of a length of the center console, the storage trough having an electrical energy supply interface; and at least two different electrical functional units which each individually are selectively arrangeable at least partially in a storage space of the storage trough, wherein the at least two different electrical functional units includes a first electrical functional unit configured as a coffee machine having an electrical energy supply connector configured to couple with the energy supply interface and a second electrical functional unit configured as an active cooling box having an energy supply connector configured to couple with the electrical energy supply interface, wherein the at least two different electrical functional units are each removable from and insertable into the storage space of the storage trough by a user, wherein one of the first and second different electrical functional units are selected and inserted by the user to arrange on the center console, and wherein the electrical energy supply interface is configured to automatically connect with the energy supply connector of the functional unit selected and inserted.

10. The front seat assembly according to claim 9, wherein the front seat has, on its side facing toward the center console, an armrest which extends over a rearward portion of the storage trough.

11. The front seat assembly according to claim 10, wherein the selected one of the at least two different electrical functional units is arranged at least predominantly under the armrest.

12. The front seat assembly according to claim 11, wherein the armrest has at least one beverage holder arranged on a forward end of the armrest.

13. The front seat assembly according to claim 12, wherein the armrest is arranged pivotably on the front seat.

14. The front seat assembly according to claim 9, wherein the second electrical functional unit functions as a refrigerator.

* * * * *